P. W. THOMPSON.
TRANSMISSION GEARING FOR BICYCLES.
APPLICATION FILED FEB. 12, 1916.

1,204,519.

Patented Nov. 14, 1916.

Inventor
P. W. Thompson

Witnesses
A. C. Newkirk

By Victor J. Evans
Attorney

UNITED STATES PATENT OFFICE.

PERCY WALLACE THOMPSON, OF TUSCALOOSA, ALABAMA.

TRANSMISSION-GEARING FOR BICYCLES.

1,204,519.  Specification of Letters Patent.  Patented Nov. 14, 1916.

Application filed February 12, 1916. Serial No. 77,908.

*To all whom it may concern:*

Be it known that I, PERCY W. THOMPSON, a citizen of the United States, residing at Tuscaloosa, in the county of Tuscaloosa and State of Alabama, have invented new and useful Improvements in Transmission-Gearing for Bicycles, of which the following is a specification.

The invention relates to bicycle change-speed gearing, and more particularly to the class of transmission gearing for bicycles or the like.

The primary object of the invention is the provision of a gearing of this character wherein the bicycle can be driven at different speeds without necessitating the changing of sprockets, the gearing being of novel construction so that it can be readily changed with despatch.

Another object of the invention is the provision of a transmission of this character wherein the same is confined within the crank shaft casing of the frame of a bicycle and is manually controlled to effect a variance in the speed of travel of such bicycle.

A further object of the invention is the provision of gearing of this character which is simple in construction, thoroughly reliable and efficient in its operation, strong, durable, and inexpensive of manufacture.

Other objects of the invention will be in part obvious and in part hereinafter pointed out.

The invention accordingly consists in the features of construction, combination of elements and arrangement of parts exemplified in the construction hereinafter described, the scope of the application of which will be indicated in the claim hereunto appended.

Figure 1:
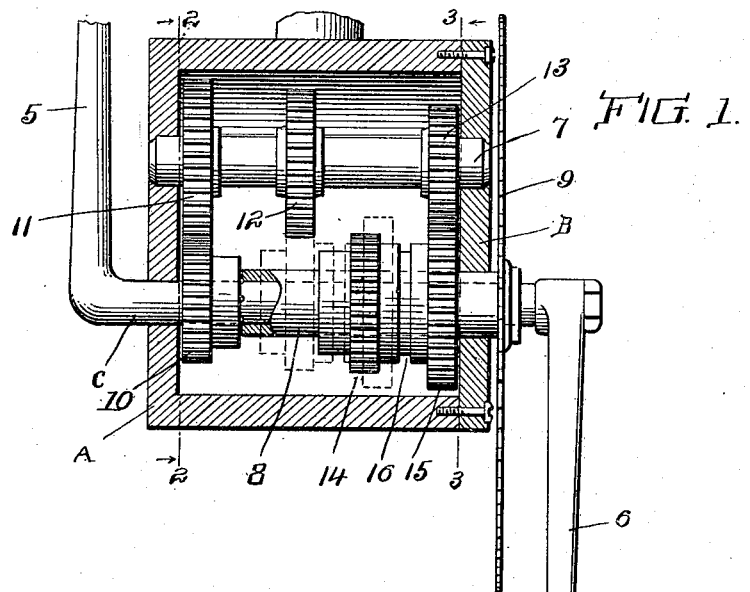
Figure 2:
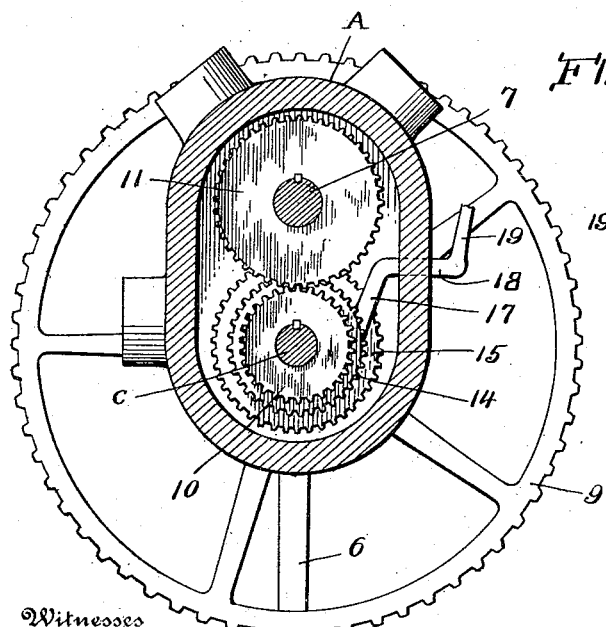
Figure 3:
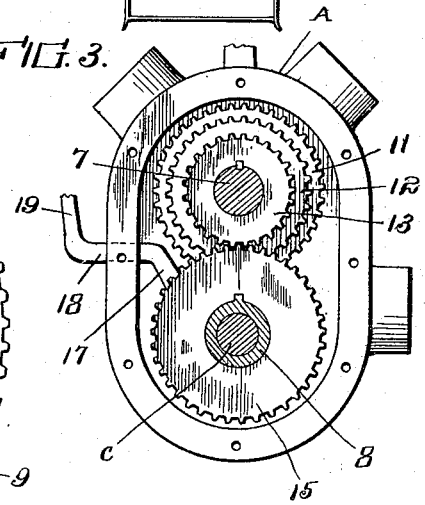

In the accompanying drawings: Figure 1 is a vertical sectional elevation through the crank shaft casing of a bicycle frame showing the transmission gearing constructed in accordance with the invention; Fig. 2 is a sectional view on the line 2—2 of Fig. 1; and Fig. 3 is a sectional view on the line 3—3 of Fig. 1.

Similar reference characters indicate corresponding parts throughout the several views of the drawing.

Referring to the drawing in detail, A designates a crank shaft casing of the frame of a bicycle having a removable side plate B to permit access to the interior of the casing, and C the crank shaft which is journaled transversely in the crank shaft casing, and is formed with an integral pedal crank 5 at one side of the casing, while at the opposite side of said casing is a separable pedal crank 6 which is suitably detachably connected to the crank shaft.

Superposed with relation to the crank shaft C and journaled in the casing A is a countershaft 7, while telescoped upon the crank shaft C is a sleeve 8, the latter being projected through one side of the casing A and has fixed thereto the front sprocket wheel 9 which is of the ordinary well known construction, and over which is adapted to be trained the sprocket chain (not shown) for the driving of the rear wheel of the vehicle. Fixed to the crank shaft C is a small gear 10 meshing with a large gear 11 fixed to the countershaft 7, the latter being also fitted with the respective gears 12 and 13 which are of different sizes with respect to each other, the same being keyed or otherwise fixed to said shaft.

Slidably keyed or splined upon the sleeve 8 for movement longitudinally thereon is double change speed gear 14 and 15 respectively, the gear 15 being of considerably larger size than the gear 14, and these gears are integral with each other, while between the same is formed an annular channel 16 in which engages a fork 17 having a crank 18 extended through the front wall of the casing A. Said crank 18 has an arm 19 extended in convenient reach of the user of the bicycle so that on actuating the arm 19 the double change speed gear can be moved on the sleeve 8 for shifting the gear 14 into meshing engagement with the gear 12 or to bring the gear 15 into engagement with the gear 13, thereby varying the speed of travel of the bicycle. It is, of course, understood that the sleeve 8 is loose upon the crank shaft C and on the turning of the latter motion is imparted from the gear 10 to the gear 11, thence from the shaft 7 carrying the same through either of the gears 12 or 13 to one of the gears 14 and 15 respectively of the double change speed gear, which latter is slidably splined or keyed on the sleeve 8 carrying the sprocket 9, over which the driving chain is trained, and by the shifting of the double change speed gear two speeds in the travel of the bicycle can be effected.

From the foregoing description, taken in connection with the accompanying drawings, the construction and operation of the invention will be readily apparent, and therefore a more extended explanation has been omitted.

Having thus described my invention, I claim:

A transmission gearing for a bicycle or the like comprising a crank casing, a crank shaft journaled therein, a counter-shaft journaled in said casing above and parallel with said crank shaft, a plurality of gears fixed to the countershaft and being of different sizes with respect to each other, a driving gear fixed to the crank shaft and meshing with one of the gears on the counter-shaft, a double slidable gear of different sizes with respect to each other and rotatably supported about the crank shaft and alternatively engageable with either of the remaining gears on the counter-shaft, a rocking arm mounted within the casing and having a portion thereof engageable with the double slidable gear for moving the same upon the crank shaft, a sleeve surrounding the crank shaft and having one end projecting through the casing and slidably supporting the double slidable gear, and a sprocket wheel fixed to the projecting end of the sleeve outside the casing.

In testimony whereof I affix my signature in presence of two witnesses.

PERCY WALLACE THOMPSON.

Witnesses:
I. S. HARDIN,
H. L. SMITH.

Copies of this patent may be obtained for five cents each, by addressing the "Commissioner of Patents. Washington, D. C."